May 27, 1941.   J. LAMB   2,243,711
AUTOMATICALLY ACTING RELIEF VALVE
Filed March 7, 1939   2 Sheets-Sheet 1
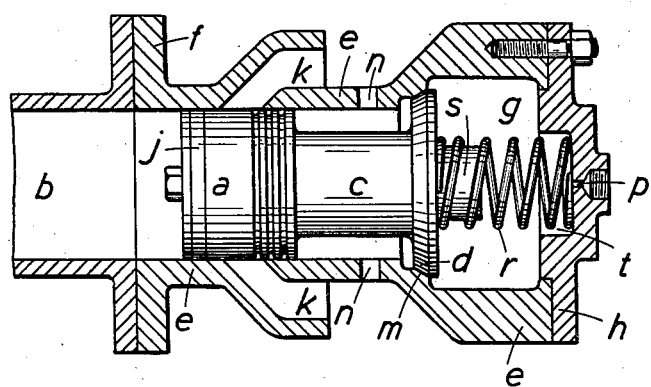
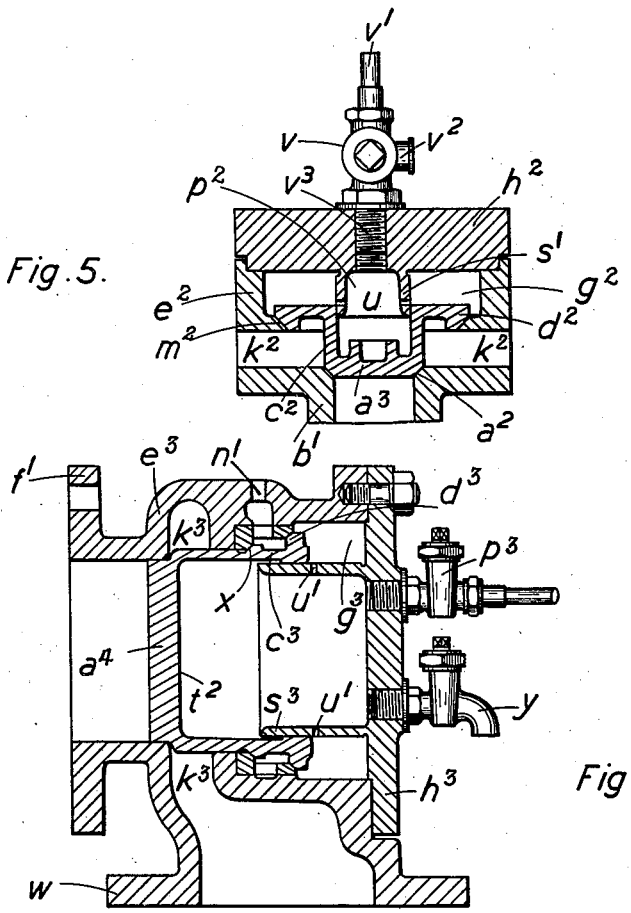
INVENTOR:
JOHN LAMB
BY Francis E. Boyce
ATTORNEY Patented May 27, 1941

2,243,711

UNITED STATES PATENT OFFICE 2,243,711

AUTOMATICALLY ACTING RELIEF VALVE

John Lamb, Monkseaton, Northumberland, England

Application March 7, 1939, Serial No. 260,323
In Great Britain March 25, 1938

5 Claims. (Cl. 137—53)

This invention relates to automatically acting relief valves, and is primarily intended for the starting-air systems of Diesel and similar internal-combustion engines, though it is also applicable generally as a relief valve to any engine or device in which gaseous pressure is used.

In a Diesel engine, there is a risk of the occurrence of dangerously high pressure in the starting-air system, and it is imperative to provide automatically acting devices for releasing excess pressure immediately such pressure arises. Should the relief device fail to function when required, serious damage may be done to parts of the starting-air system and life may be endangered. Hitherto it has been the practice to employ either a spring-loaded relief valve which is automatically unseated when the pressure in the starting-air system exceeds a predetermined pressure, or a thin diaphragm which ruptures under excessive pressure, such a valve or diaphragm being usually provided at one or both ends of the starting-air manifold. Spring-loaded relief valves as hitherto used have the disadvantage that they require to be heavily loaded to prevent leakage under normal working conditions, and their tendency is to open gradually thereby restricting the opening available for the quick release of excess pressure in the event of an explosion occurring in the starting-air system. The bursting diaphragm type of device satisfies the requirement of quick release of excess pressure as, immediately the diaphragm ruptures, an opening equal to the full area of the starting-air manifold is available, but this arrangement has the disadvantage that the engine cannot be restarted until a new diaphragm has been fitted. On a ship, the delay thereby occasioned may be dangerous. Moreover the very thin diaphragms used tend to be weakened by fatigue and corrosion and are liable to rupture at normal pressure with consequent danger.

The object of the present invention is to provide an improved relief device possessing the advantages of both the types of safety devices referred to above while avoiding their disadvantages; that is to say, a relief valve which will act automatically upon a predetermined pressure being exceeded and will instantly provide an opening for the release of excess pressure sufficiently large to render impossible the occurrence of dangerously high pressure, said valve continuously protecting from damage the engine to which it is fitted, and, after coming into operation, automatically reverting to its normal condition immediately the excess pressure has been released thus leaving the engine available for duty without delay.

With this and other objects in view, as will appear as the description proceeds, my invention consists in the novel features of construction and combinations and arrangements of parts herein fully described and set out in the appended claims.

The accompanying drawings illustrate four forms of automatically acting relief valves in accordance with my invention. In the drawings Figure 1 is a central section of one construction of relief valve, the moving part of which is shown in the seated position which it normally occupies;

Figure 5 is a central section of another construction of relief valve showing the moving part in its seated position, and Figure 6 is a central section of a relief valve suitable for application to a pump dealing with a fluid, the moving part being shown in its seated position.

Figure 2:
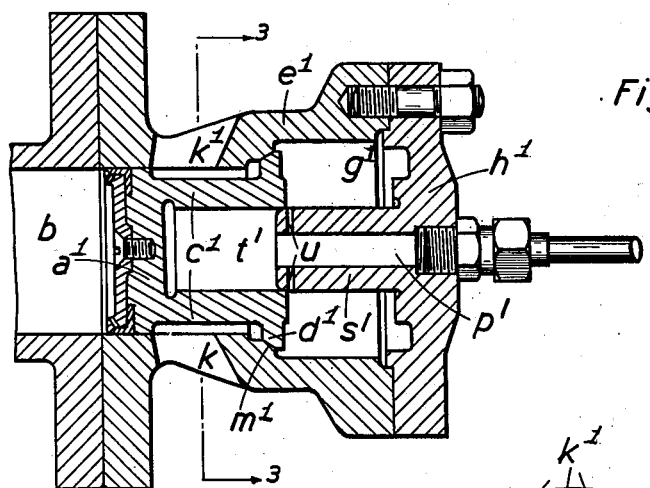
Figures 2 and 4 are central sections of a modified construction of relief valve, Fig. 2 showing the moving part in its seated position and Fig. 4 showing it unseated.

Referring to the drawings, in the example illustrated in Fig. 1 which is intended for application to the starting-air manifold of a Diesel engine, the device comprises a two-part relief valve of which one part $a$ is a piston having one end exposed to the pressure in said manifold, the end of which is shown at $b$, the other end of said piston being attached by a reduced connecting portion $c$ to a disc valve $d$ concentric with the piston $a$ and forming the second part of the relief valve. The relief valve $a$, $c$, $d$ is housed in a cylindrical casing $e$ which has a flange $f$ at its end adjacent to the piston for attachment to the end of the starting-air manifold and is provided at its other end with a chamber $g$ closed by a detachable cover plate $h$. The piston $a$ is fitted with an L-shaped leather ring $j$ to prevent leakage of starting-air from the manifold $b$, and said piston in its normal closed position covers a ring of lateral ports $k$ in the valve casing open to atmosphere, the combined area of the ports $k$ being at least equal to the cross-sectional area of the manifold.

The area of the disc valve $d$ is somewhat greater than that of the end of the piston $a$, say in the proportion of five to four, and the mitred edge of the disc valve in its normal position seats itself on a seating $m$ at the inner end of the chamber $g$ in the valve casing. Small ports $n$ are provided in that portion of the valve casing $e$ between the disc valve and the piston so that, when the disc valve is unseated, the chamber $g$ is at once connected by said ports to atmosphere. The chamber $g$ is continuously supplied with compressed air through a small inlet $p$ in the cover plate $h$, said air supply being drawn from the starting-air supply at a point unlikely to be affected by an explosion in the starting-air manifold; for example, from between the starting-air master valve and the starting-air tanks. Preferably a constant load on the valve $d$ is ensured by reducing the pressure of the starting-air supply to a predetermined pressure so that variations in the pressure of the starting air have no effect on the load on the valve $d$. A light spring $r$ is provided between the face of the disc valve $d$ and the cover plate $h$, its function being to re-seat the disc valve. The spring $r$ exerts a slight pressure on the relief valve, but it is not provided for the purpose of keeping said valve closed. It functions as automatically acting means to return the relief valve to the position shown in Fig. 1 after opening of the valve.

In normal working conditions, the relief valve $a$, $c$, $d$ is maintained in the seated position illustrated in Fig. 1 by the pressure of the compressed air in the chamber $g$ on the face of the disc valve $d$, which face is larger than the end of the piston $a$ exposed to the pressure in the starting-air manifold $b$. If the pressure in the latter increases sufficiently to overcome the load on the disc valve $d$, the two-part relief valve will be forced back by said increased pressure and the disc valve eased off its seating $m$, thereby putting the chamber $g$ into communication with the atmosphere through the annular space surrounding the portion $c$ of the relief valve and the small ports $n$ in the valve casing. As the area of opening of the inlet $p$ for admitting compressed air to the chamber $g$ is a mere fraction of the area of the ports $n$, the pressure in said chamber $g$ is instantly reduced and, the load on the relief valve being thus removed, said valve is forced back as far as it will go, its piston $a$ uncovering the ring of lateral ports $k$ the combined area of which is at least equal to the cross-sectional area of the starting-air manifold $b$, whereupon the pressure in said manifold is instantly relieved. Although the relief valve operates at explosive speed, no shock results because, as the relief valve approaches the limit of its travel, a cushioning effect is automatically produced by a central boss $s$ projecting from the face of the disc valve $d$ entering a corresponding recess $t$ in the cover plate $h$ in which is the inlet admitting compressed air to the chamber $g$.

When the pressure in the manifold $b$ has been released, the spring $r$ acting on the disc valved $d$ returns the relief valve to its normal seated position, and, immediately the disc valve re-seats itself, the air pressure in the chamber $g$ will be built-up and the relief valve maintained in its seated position as shown in Fig. 1 with its piston $a$ closing the end of the manifold $b$.

The action of my improved relief valve is so balanced that, even if the gases in the starting-air manifold expand at explosive rate, the pressure in said manifold is kept from dangerously exceeding normal working pressure, and consequently risk of damage to any part of the starting-air system is eliminated.

Figure 3:
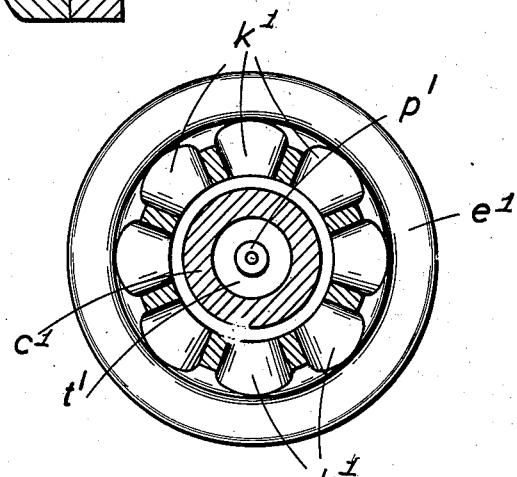
Figure 3 is a section on the line 3—3 in Fig. 2.
Figure 4:
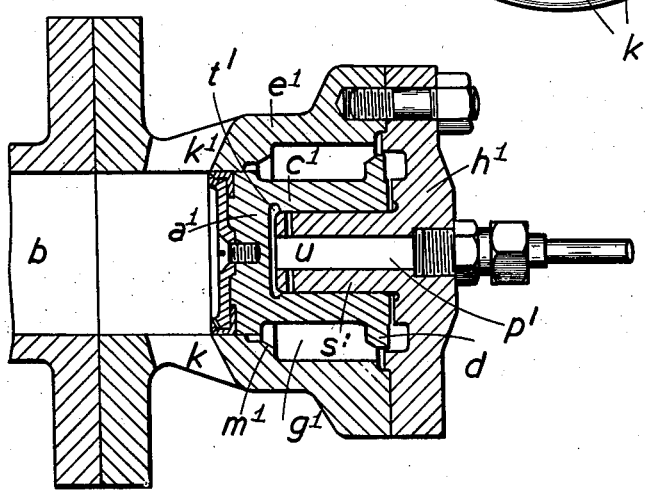

Figs. 2, 3 and 4 illustrate a modified form of the relief valve above described. In this alternative example, the piston valve $a^1$ is of less length than in the construction shown in Fig. 1, and the small ports $n$ are dispensed with, relief ports $k^1$ being formed in the casing $e^1$ to serve the purpose of both the said small ports and the lateral ports $k$ of Fig. 1, that is to connect to atmosphere both the annular space around the reduced connecting portion $c^1$ between the piston $a^1$ and the disc valve $d^1$ of the relief valve and the chamber $g^1$ when said valve is unseated. The valve $d^1$ is normally seated on a seat $m^1$ in the same manner as described in connection with Fig. 1. The re-seating spring $r$ of Fig. 1 is also dispensed with, and in place of the boss $s$ and recess $t$ shown in Fig. 1, a boss $s^1$ is provided on the cover $h^1$ which co-operates with a cylindrical recess $t^1$ in the relief valve. The inlet for compressed air is enlarged and is extended by a port $p^1$ through the boss $s^1$, said port communicating with the chamber $g^1$ through lateral ports $u$ in said boss when the relief valve is in its seated position.

The operation of the relief valve illustrated in Figs. 2 to 4 is the same in principle as that illustrated in Fig. 1, the only difference being that, in place of the re-seating spring $r$, the compressed air admitted through the port $p^1$ functions as the automatically acting means which returns the relief valve to its seated position after opening.

In normal working conditions, the relief valve is maintained in the seated position illustrated in Fig. 2 by the steady pressure of the compressed air in the chamber $g^1$ on the face of the disc valve $d^1$ and on the bottom of the recess $t^1$ which pressure normally exceeds that on the end of the piston $a^1$ exposed to the manifold $b$. If the pressure on said piston end overcomes the opposed load even only to a slight degree, the relief valve is instantly forced back into the position shown in Fig. 4 whereupon the ports $k^1$ are uncovered and the pressure in the manifold relieved. At the same instant the movement of the valve releases the pressure in the chamber $g^1$ through the annular space around the portion $c^1$ of the valve and simultaneously cuts-off the supply of compressed air to said chamber by closing the ports $u$. The compressed air entering by the port $p^1$ immediately acts on the bottom of the recess $t^1$ and, the pressure in the manifold $b$ being temporarily dissipated, returns the valve to its seated position and re-opens communication between the compressed air port $p^1$ and the chamber $g^1$ thereby restoring the normal load on the valve which resists its unseating. The time taken for the valve automatically to relieve excess pressure in the manifold and to re-seat itself is extremely short, and the engine can be immediately re-started.

The boss $s^1$ forms a guide to the valve and co-acts with the recess $t^1$ to produce a cushioning effect on the valve which eliminates shock.

In the alternative construction of relief valve illustrated in Fig. 5, I substitute a disc valve $a^3$ for the piston valve $a^1$ of Figs. 2 and 4, thus employing as the moving part of the device a two-part valve comprising the concentric disc valves $a^3$ and $d^2$ connected together by the intermediate portion $c^2$, the valve $a^3$ being of smaller diameter than the valve $d^2$. The mitred edge of the valve $a^3$ normally seats itself on a seating $a^2$ around the branch pipe $b^1$ opening into the starting-air manifold, while the valve $d^2$ seats on a seating $m^2$ formed on the inner wall of the casing $e^2$, said casing being provided with lateral ports $k^2$ serving the same purpose as the ports $k^1$ of Fig. 2.

Reference letters are affixed to the other parts of the relief valve illustrated in Fig. 5 which correspond with those applied to the same parts of the valve of Figs. 2 to 4, the operation of the valve of Fig. 5 being the same as that of Figs. 2 to 4. The only difference is the substitution of the disc valve $a^3$ for the piston $a^1$ of said Figs. 2 to 4, which allows of a more compact construction.

The port $p^2$ in the boss $s^2$ depending from the cover $h^2$ of the relief valve of Fig. 5 is provided with a three-way cock $v$ having ports $v^1$, $v^2$, $v^3$ connected to the starting-air supply, atmosphere and the port $p^2$ respectively. The cock $v$ permits the working of the valve to be tested at any time without either stopping the engine or altering the pressure in the cylinders thereof. This is effected by manipulating the cock $v$ to reduce the loading pressure applied to the valve $d^2$, said cock being returned to normal position after the testing operation. The cock $v$ can also be employed in like manner to test the combustion pressure in the engine cylinders, or as a decompression valve, for, by manipulating said cock to shut the port $v^1$ (thereby cutting-off pressure air flowing from the starting-air supply) and to open the port $v^2$ to atmosphere, the pressure in the chamber $g^2$ can be permitted to escape through the port $p^2$, thus destroying the load on the valve $d^2$, whereupon the relief valve will at once be unseated and release any pressure in the engine cylinders.

While I have described, by way of example, the application of my improved relief valve to the starting-air system of a Diesel engine, it will be understood that said valve may be applied to other engines and devices wherein compressed air or steam is employed; for example, to a steam-driven oil or water pump, in which case the relief valve would be loaded by steam taken from the pipe supplying the pump.

Fig. 6 illustrates a modified construction of my relief valve suitable for a steam-driven pump. In this example, $a^4$ is the piston portion of the relief valve and $d^3$ is the disc valve portion. The flange $f^1$ of the valve casing $e^3$ is attached to the discharge side of the pump, and the relief outlets $k^3$ are connected by the flange $w$ to the suction side thereof. The annular space between the disc valve $d^3$ and a mitred edge $x$ around the portion $c^3$ of the relief valve is continuously open to atmosphere through a ring of holes $n^1$ around the valve casing. Steam is led through the cock $p^3$ into a hollow boss $s^3$ on the detachable cover $h^3$ of the valve casing co-operating with a cylindrical recess $t^2$ in the valve, the interior of said boss communicating with the chamber $g^3$ through the ports $u^1$ therein. A bye-pass cock $y$ in the cover $h^3$ permits the boss $s^3$ to be drained.

In the operation, the pressure of the steam entering the recess $t^2$ and the chamber $g^3$ through the cock $p^3$ is sufficient to maintain the valve seated as shown in Fig. 6. Excess pressure on the pump-discharging side of the piston valve $a^4$ however overcomes said load and forces the valve to the right whereupon the relief outlets $k^3$ are uncovered and the excess pressure on the discharge side of the pump is instantly relieved. At the same instant the valve $d^3$ and mitred edge $x$ are unseated thereby placing the chamber $g^3$ into communication with the atmosphere and cutting-off the steam supply thereto through the ports $u^1$. The steam entering by the cock $p^3$ acts on the bottom of the recess $t^2$ and returns the valve to its seated position thereby re-opening the ports $u^1$ to the chamber $g^3$ and simultaneously cutting-off the communication of the latter with the atmosphere, and thus restoring the normal load on the valve which resists unseating. The hollow boss $s^3$ and the recess $t^2$ co-operate in the same manner as the boss $s^1$ and recess $t^1$ of the constructions shown in Figs. 2 to 4.

The mitred edge prevents liquid in the relief outlets $k^3$ from leaking into the atmosphere through the holes $n^1$ in the event of a pressure prevailing in the pump suction when the relief valve is in its seated position. Such a condition would occur should a pump be stopped with a pressure head at the suction.

The relief valve shown in Fig. 6 is in addition a simple and efficient bye-pass valve. Suppose, for instance, that it is desired to clear the discharge line of a pump that has been discharging to a higher level, all that is necessary is to shut the cock $p^3$ and open the cock $y$. Putting the steam space within the boss $s^3$ of the relief valve in communication with the atmosphere in this way will cause the pressure on the piston $a^4$ to unseat the relief valve and allow the liquid to pass from the discharge to the suction of the pump.

By my invention I provide relief valves which are automatic in action and enable the engine or pump to be re-started immediately the excess pressure has been released. My improved relief valve opens to its fullest extent immediately a predetermined excess of pressure is reached and reseats itself instantly and automatically immediately said excess pressure is released. Being positive in action, it can be arranged to act within narrow limits at any predetermined pressure. It cannot be overloaded, and is not likely to jam in the open position. None of the parts of the valve are likely to become weakened by fatigue or corrosion and hence to act without due cause, i. e. at normal working pressure, and renewals are unneccessary no matter how many times the valve operates. My valve can be tested for efficient working at any time without stopping the engine or altering the cylinder pressures.

What I claim as my invention and desire to secure by Letters Patent is:

1. An automatically-acting relief valve comprising a casing, a two-part valve housed therein having one operative face of greater area than the other, the smaller operative face of said valve adapted to be exposed to the space continuously charged with working fluid under pressure and wherein excessive pressure is likely to occur, a chamber in said casing beyond the larger operative face of said valve, an aperture through the wall of said chamber for supplying constant pressure fluid to said chamber from a separate source of pressure fluid whereby the pressure fluid in the latter is normally caused to act on said larger operative face to maintain said valve seated against the varying counter-pressure on its smaller operative face, relief ports in said valve casing which, while the valve remains seated, are closed by said two-part valve both to the space beyond its smaller operative face and to the chamber beyond its larger operative face but, on said valve being unseated on the counterpressure overcoming the closing pressure, release the pressure fluid acting on both faces of said valve, and means for automatically restoring the closing pressure on the larger face of the valve to reseat the latter immediately said counterpressure has been released.

2. An automatically-acting relief valve as claimed in claim 1 wherein said means for reseating the valve also acts to cushion the valve during its opening movement, said means comprising a central cylindrical recess in the larger operative face of said valve, a hollow piston-like boss within the chamber beyond said face engaging in said recess, said aperture through the wall of said chamber adapted to admit pressure fluid from said source to fluid at steady pressure into said hollow boss, and lateral ports in said boss through which pressure fluid passes from said passage into said chamber while the two-part valve is seated but which are closed when said valve is unseated.

3. An automatically-acting relief valve comprising a casing, a two-part valve housed therein having one operative face of greater area than the other, the smaller operative face of said valve adapted to be exposed to the space continuously charged with working fluid under pressure and wherein excessive pressure is likely to occur, a chamber in said casing beyond the larger operative face of said valve, a tubular boss extending into said chamber from the end wall thereof and having its innermost end disposed in a cylindrical recess in said valve, said boss having a port in its opposite end and lateral ports normally communicating with said chamber for supplying constant pressure fluid to said chamber from a separate source of pressure fluid whereby the pressure fluid in the latter is normally caused to act on said larger operative face and on the end wall of said recess to maintain said valve seated against the varying counterpressure on its smaller operative face, relief ports in said valve casing which, while the valve remains seated, are closed by said two-part valve both to the space beyond its smaller operative face and to the chamber beyond its larger operative face but, on said valve being unseated on the counterpressure overcoming the closing pressure, release the pressure fluid acting on both faces of said valve, the valve being reciprocable on said boss thereby to close said lateral ports during the unseating movement and to open the ports to the chamber during movement of the valve toward seating position thereby automatically restoring the seating pressure on the valve immediately said counterpressure has been released.

4. An automatically-acting relief valve comprising a casing, a two-part valve housed therein having one operative face of greater area than the other, the smaller operative face of said valve adapted to be exposed to the space continuously charged with working fluid under pressure and wherein excessive pressure is likely to occur, a chamber in said casing beyond the larger operative face of said valve, an aperture through the wall of said chamber for supplying constant pressure fluid to said chamber from a separate source of pressure fluid whereby the pressure fluid in the latter is normally caused to act on said larger operative face to maintain said valve seated against the varying counterpressure on its smaller operative face, relief ports in said valve casing which, while the valve remains seated, are closed by said two-part valve both to the space beyond its smaller operative face and to the chamber beyond its larger operative face but, on said valve being unseated on the counterpressure overcoming the closing pressure, release the pressure fluid acting on both faces of said valve, means for automatically restoring the closing pressure on the larger face of the valve to reseat the latter immediately said counterpressure has been released, and a three-way cock in communication with the pressure fluid inlet to said chamber thereby to permit shutting off the pressure and admission of atmospheric air to said chamber.

5. An automatically-acting relief valve as claimed in claim 1, the two-part valve comprising a pair of discs of different diameters forming the two operative faces thereof and an annular portion connecting said discs in concentric relation.

JOHN LAMB.